US008681170B2

(12) United States Patent
Glen (10) Patent No.: US 8,681,170 B2
(45) Date of Patent: Mar. 25, 2014

(54) APPARATUS AND METHOD FOR MULTI-STREAMING FOR MORE THAN THREE PIXEL COMPONENT VALUES

(75) Inventor: David I. J. Glen, Toronto (CA)

(73) Assignee: ATI Technologies ULC, Markham, Ontario (CA)

( * ) Notice: Subject to any disclaimer, the term of this patent is extended or adjusted under 35 U.S.C. 154(b) by 91 days.

(21) Appl. No.: 13/249,548

(22) Filed: Sep. 30, 2011

(65) Prior Publication Data

US 2012/0281150 A1 Nov. 8, 2012

Related U.S. Application Data

(60) Provisional application No. 61/482,817, filed on May 5, 2011.

(51) Int. Cl.
*G09G 5/02* (2006.01)

(52) U.S. Cl.
USPC .............................. 345/589; 345/1.1; 348/739

(58) Field of Classification Search
USPC .................................... 345/1.1, 589; 348/739
See application file for complete search history.

(56) References Cited

U.S. PATENT DOCUMENTS

| 6,100,899 | A * | 8/2000 | Ameline et al. .............. 345/605 |
| 6,903,706 | B1 * | 6/2005 | Trottier et al. ................. 345/1.1 |
| 8,014,615 | B2 * | 9/2011 | Uro ............................... 382/233 |
| 8,125,497 | B2 * | 2/2012 | Graves et al. ................. 345/604 |
| 8,189,908 | B2 * | 5/2012 | Uro ............................... 382/166 |
| 2005/0063586 | A1 * | 3/2005 | Munsil et al. ................. 382/162 |
| 2005/0066085 | A1 * | 3/2005 | Kobayashi ....................... 710/62 |
| 2005/0097341 | A1 * | 5/2005 | Francis et al. ................. 713/189 |
| 2006/0153476 | A1 * | 7/2006 | Munsil et al. ................. 382/299 |
| 2006/0244686 | A1 * | 11/2006 | Higgins et al. .................. 345/72 |
| 2007/0222790 | A1 * | 9/2007 | Winger .......................... 345/592 |
| 2008/0231577 | A1 * | 9/2008 | Lin et al. ......................... 345/90 |
| 2008/0247462 | A1 * | 10/2008 | Demos ...................... 375/240.03 |
| 2009/0142041 | A1 | 6/2009 | Nagasawa et al. |
| 2009/0201306 | A1 * | 8/2009 | Dyke ............................. 345/545 |
| 2009/0201309 | A1 * | 8/2009 | Demos .......................... 345/589 |
| 2009/0208189 | A1 | 8/2009 | Sasaki et al. |
| 2009/0220213 | A1 | 9/2009 | Ogawa et al. |
| 2009/0290071 | A1 * | 11/2009 | Feng ............................. 348/725 |
| 2010/0013840 | A1 * | 1/2010 | Hunkins et al. ............... 345/502 |
| 2010/0123733 | A1 * | 5/2010 | Zaharia et al. ................ 345/604 |
| 2010/0125648 | A1 * | 5/2010 | Zaharia et al. ................ 709/219 |

(Continued)

OTHER PUBLICATIONS

Brennesholtz, Matt; 3D Professionals (and Consumers) Get New Options; www.insightmedia.info; Dec. 17, 2008.

(Continued)

*Primary Examiner* — Maurice L McDowell, Jr.
(74) *Attorney, Agent, or Firm* — Faegre Baker Daniels LLP (57) ABSTRACT

A method and apparatus provides pixel information for one or more displays by producing for output on a single link, packet based pixel component multi-stream information on two or more streams. A first stream may include a portion of per-pixel component values, such as RGB pixel component values, whereas the second stream of the multi-stream may include a remaining portion of the per-pixel component values, such as a corresponding alpha value. Hence, multi-streams are employed to communicate, for example, an extended pixel component format for output to one or more displays. The multi-streams are synchronized to provide the pixel component values at a proper time for the receiving display or plurality of displays.

19 Claims, 3 Drawing Sheets

(56) References Cited

U.S. PATENT DOCUMENTS

| | | | |
|---|---|---|---|
| 2011/0141122 A1* | 6/2011 | Hakura et al. | 345/505 |
| 2011/0157302 A1 | 6/2011 | Glen | |
| 2012/0062711 A1* | 3/2012 | Ikeda et al. | 348/51 |
| 2012/0120079 A1* | 5/2012 | Hunkins et al. | 345/504 |
| 2012/0188444 A1* | 7/2012 | Choi et al. | 348/441 |
| 2012/0229486 A1* | 9/2012 | Kobayashi | 345/581 |
| 2012/0274849 A1* | 11/2012 | Suzuki et al. | 348/500 |

OTHER PUBLICATIONS

Draft DisplayPort Specification, Topology Management; pp. 1-65; ~Jul. 2009.

Draft DisplayPort Specification, Multistream Transport; pp. 1-26; ~Jul. 2009.

Draft DisplayPort Specification Presentation, DP1.2 Sideband Messaging Syntax; Jul. 1, 2009.

Proposed VESA DisplayPort Standard; Version 1, Revision 2; Oct. 14, 2009.

DisplayPort Slides; Intel Developer Form; ~Sep. 2008.

DisplayPort v1.2 Technical Proposal Overview; VESA Systems Committee; pp. 1-12; Jul. 9, 2008.

Slide DisplayPort Beyond 1.1a; ~Sep. 2008.

Draft DisplayPort Specification Sections 2.3-2.3.5.6 regarding multistreaming; ~Sep. 2008.

International Search Report and Written Opinion from Canadian Patent Office; International Application No. PCT/CA2010/002075; dated Mar. 14, 2011.

* cited by examiner

APPARATUS AND METHOD FOR MULTI-STREAMING FOR MORE THAN THREE PIXEL COMPONENT VALUES

RELATED CO-PENDING APPLICATIONS

This application claims priority to the provisional patent application having Application No. 61/482,817, filed on May 5, 2011, having inventor David Glen, titled "APPARATUS AND METHOD FOR MULTI-STREAMING FOR MORE THAN THREE PIXEL COMPONENT VALUES", which is related to co-pending application having Ser. No. 12/695,783, filed on Jan. 28, 2010, having inventor David Glen, titled "THREE-DIMENSIONAL VIDEO DISPLAY SYSTEM WITH MULTI-STREAM SENDING/RECEIVING OPERATION", owned by instant assignee which claims priority from and the benefit of U.S. Provisional Patent Application No. 61/291,080, filed Dec. 30, 2009, entitled "THREE-DIMENSIONAL VIDEO DISPLAY SYSTEM WITH MULTI-STREAM SENDING/RECEIVING", which is hereby incorporated herein by reference in its entirety and is related to co-pending application having docket Ser. No. 12/954,046, filed on Nov. 24, 2010, having inventor David Glen, titled "METHOD AND APPARATUS FOR PROVIDING TEMPORAL IMAGE PROCESSING USING MULTI-STREAM FIELD INFORMATION", owned by instant assignee which is hereby incorporated herein by reference in its entirety.

BACKGROUND OF THE INVENTION

The disclosure relates generally to display systems and related methods that utilize more than three pixel component values per pixel, such as but not limited to, display systems (including video display systems or printers) that use an RGBW format, RGBA format or other pixel format that requires communication of more than three pixel component values per pixel.

Display systems are known to use color formats that employ more than three data values per pixel, such as RGBW. Each pixel requires the storage of 4 component values in frame buffer memory. The system communicates these pixel values across buses from frame buffers to display controllers or across video interfaces such as a Display Port type interface, digital video interface (DVI) or other suitable interface, to one or more displays.

One known method of communicating the four pixel component values to a display is to use multiple video data interfaces in parallel. For example one interface can carry color data, while the other carries the alpha data. This is commonly used in video production studios, where two HD-SDI interface cables are used in parallel to carry color and alpha data for the same video data stream.

Another known system is to alternate the sending of different data components in sequential pixel cycles. For example even pixel cycles may carry RGB color data, and odd pixel cycles may carry alpha data. The interleave could be on single pixels, groups of pixels, lines or frames.

Yet another approach is to "pack" data values so that each "pixel" cycle of the video interface carries only three components from single image pixel, or parts of two different image pixels. For example sending RGBW data over a 3 value/cycle interface could be done as:

| Cycle# | R value | G value | B value |
|--------|---------|---------|---------|
| 0 | R0 | G0 | B0 |
| 1 | W0 | R1 | G1 |
| 2 | B1 | W1 | R2 |
| 3 | G2 | B2 | W2 |
| 4 | R3 | G3 | B3 |

And so on.

It can be seen that 3 RGBW pixel values may be packed into every 4 data cycles on the video data interface. Similar packings can be done for 4, 5 or more components per image pixel. However such packing may unnecessarily limit the performance of a display system.

It is also known to convert from a three color space to a four color space, for example, using gamut remapping as known in the art. For example, display systems may employ, for example, graphics processors and a plurality of corresponding display controllers. The display controller obtains stored pixel component values from one or more frame buffers. A single gamut remap engine in one of the graphics processors, for example, may perform the conversion process to go from a three component value format to a four or more pixel component value format. A display controller may also include the remap engine. In some systems, multiple display controllers wherein one display controller uses gamut remapping to generate RGB component data and another display controller uses gamut remapping to generate corresponding alpha data. The resulting RGB component data is output on one cable to a composite board and the corresponding alpha data is output on a separate cable to the composite board. The composite board composites the RGB and alpha data for output on one or more displays.

The DisplayPort 1.2 standard is a digital interface to connect with monitors (displays). The DisplayPort 1.2 standard enables packet based multi-streaming of different video streams for multiple monitors so that a hub or computer may provide differing display streams to differing monitors. As such, a single cable or wireless interface may be employed.

DisplayPort 1.2 enables multiple independent display streams for different monitors, that are interleaved. As such, a few pixels for each monitor may be interleaved in packets that may be generated by an encoder. Also, one display may be a branch device or hub that receives streams for multiple displays (e.g., sink/logical branch), such a sink typically processes one or more streams, each stream dedicated to a single image and passes through the rest of the streams to other sinks/devices. There is identification data to identify subcomponents of a packet so that bytes from a packet may be identified to correspond to the same stream and hence the same monitor. One packet can include pixels for multiple displays. One display (e.g., video sink device) may also be set up as a logical branch device that receives multiple streams and displays multiple streams as separate streaming video streams, each having different images. A unique address is assigned to each logical sink in the logical branch device and a common global universal ID (GUID) is used for the logical sinks.

It has been proposed, for example, for a monochrome display using a DisplayPort 1.2 interface to use a single data value per pixel pack mode for display port video streams for use with monochrome displays. As such, DisplayPort 1.2 includes a mechanism to operate in a Y only packing mode. One data value for each pixel is utilized for monochrome monitors. This Y only packing mode uses one standalone stream to provide the Y data for a monochrome monitor. The DisplayPort 1.2 interface standard only contemplates sending a single stream for each image to a device, although a device may receive multiple streams each for a different image to facilitate picture in picture type display. For example, a single image stream may contain either a single component, such as Y only for a monochrome display, or three components such as an RGB based stream for a single image stream.

It would be desirable to provide an improved display system that better accommodated pixel data formats that used more than three pixel component data values per pixel.

BRIEF DESCRIPTION OF THE DRAWINGS

The invention will be more readily understood in view of the following description when accompanied by the below figures and wherein like reference numerals represent like elements, wherein.

DETAILED DESCRIPTION OF THE PREFERRED EMBODIMENTS

Briefly, a method and apparatus provides pixel information for one or more displays by producing for output on a single link, packet based pixel component multi-stream information on two or more streams. A first stream may include a portion of per-pixel component values, such as RGB pixel component values, whereas the second stream of the multi-stream may include a remaining portion of the per-pixel component values, such as a corresponding alpha value. Hence, multi-streams are employed to communicate, for example, an extended pixel component format for output to one or more displays. The multi-streams are synchronized to provide the pixel component values at a proper time for the receiving display or plurality of displays.

Pixel component formats that employ even larger numbers of component values, such as 5 or 6 color component values, are also accommodated for sending over a single link. Pixel component values of a pixel are obtained for an image stream from, for example, a frame buffer memory. A pixel component multi-stream encoder produces for output on the single link, the packet based pixel component multi-stream information that includes the first stream and second stream for output to one or more displays. In one example, the packet based pixel component multi-stream information produces a first stream that includes color component data (e.g., RGB, YUV) and a second stream that produces extended pixel data, such as alpha data or Z data, corresponding to the color component data of each pixel.

In another example, an apparatus for providing pixel information for one or more displays may switch in and out of a multi-stream pixel component packing mode based on a type of display that is used to display the pixel information. For example, if the apparatus employs one or more displays that are compliant with the DisplayPort standard, such displays may automatically indicate that they are capable of this operation through various mechanisms such as communicating data back to the apparatus indicating their capability, or a user may alternatively use a user interface to indicate to the apparatus the display type(s). If it is determined that the type of display is capable of handling multi-stream pixel component information, the apparatus changes from a non-multi-stream pixel component packing mode to a multi-stream pixel component packing mode. If displays are then changed for the apparatus wherein the changed displays do not support the multi-stream pixel component packing mode, this change in display type is also detected. This may be detected, for example, through any suitable display communication protocol and the apparatus switches out of multi-stream pixel component packing mode automatically. To accommodate different display types or pixel formats, the multi-stream component encoder may also be part of a larger pixel format encoder that in addition to packing pixel information in a multi-stream mode, may instead format the stream in a DVI or HDMI format so that differing types of displays may be used by the apparatus.

Accordingly, a transparency value or one or more additional color values or depth values or other relevant values may be sent in a stream apart from the stream that includes the primary pixel component values such as the RGB values for one or more displays. In such a way, multi-streaming functionality such as that which was compliant with the DisplayPort 1.2 standard can be used to allow for more pixel component values to be associated with a single pixel for a single image rather than or in addition to allowing separate streams for each image in a system.

For example, it may be desirable to carry an alpha pixel component value as well as RGB pixel component values for each pixel or a video data interface. The extra alpha value could be for use in image layer composition in the device receiving the video data stream. As another example, display devices that use more than three subpixel color values such as those that may use an additional white subpixel value (RGBW) may use a single link that communicates multiple streams that are suitably synchronized so that all pixel component values are received by the display system in a suitably synchronized manner. Other display systems may utilize two different shades of green subpixels, for example, while other displays may employ five or six different pixel color component values. For example, color printers may use four, five, six or more ink colors in order to reproduce a wider and more accurate spectrum of colors. Two or more image streams are received by a single receiver, for example, utilizing DisplayPort 1.2 multi-streaming. Both streams are sent in close synchronization so there is little cost added in the source or sink device to buffer data values to reassemble back into complete pixels.

As such, a second three component value stream packing structure may be used to pack only alpha values whereas the first stream has packets of all three component values. In another example, the single data value per pixel format may be employed to send the second stream or alpha value to get an improved bandwidth situation compared to sending the alpha value in a three value stream packing format. If more than four color component values are utilized per pixel, then additional streams may be employed.

Figure 1:
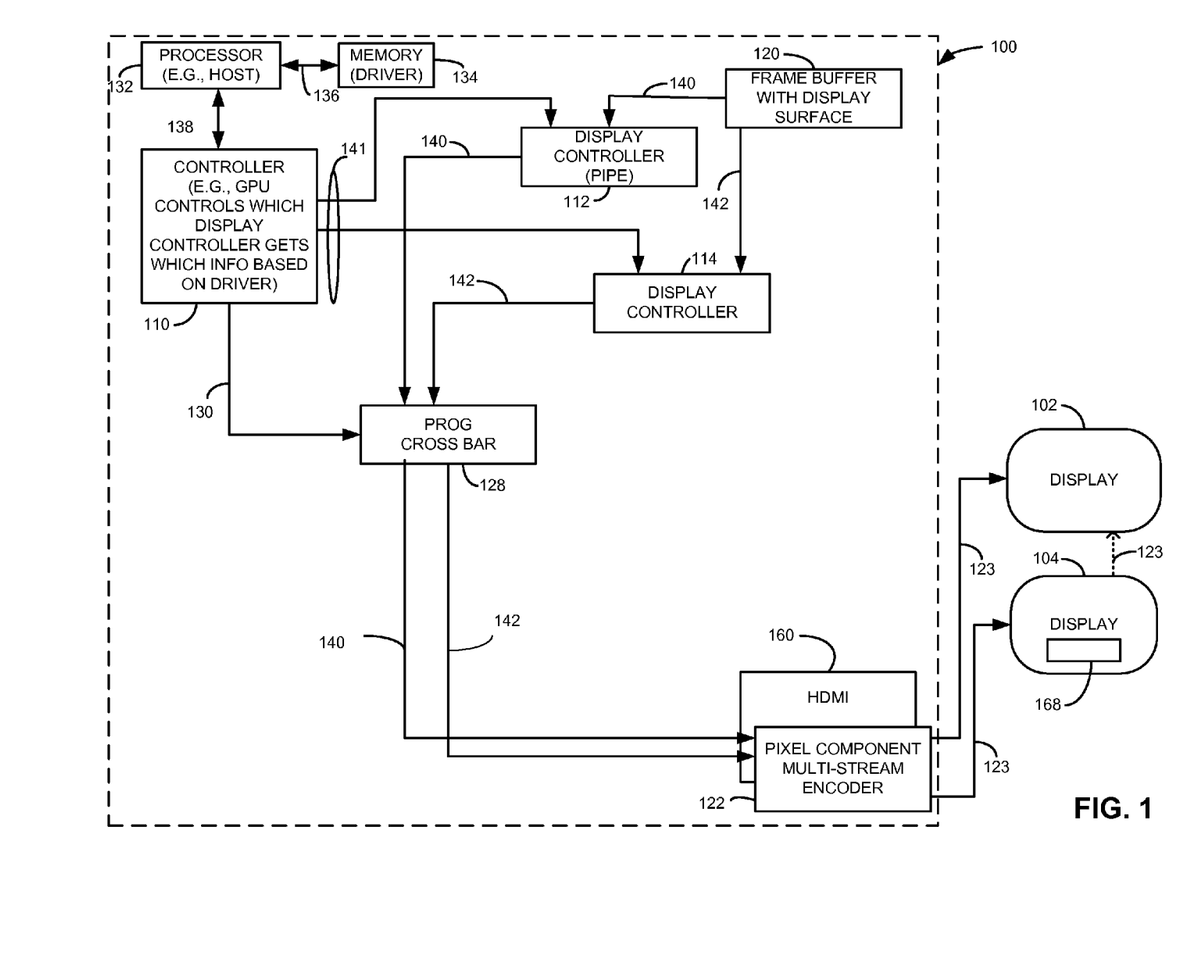
FIG. 1 is a block diagram illustrating one example of a display system in accordance with one example set forth in the disclosure.

FIG. 1 illustrates one example of an apparatus 100 for providing pixel information for one or more displays 102 and 104. In this example, the apparatus 100 includes a controller 110 and one or more display controllers 112, 114 each corresponding to one of the plurality of displays 102-104. In this example, the apparatus 100 also includes a frame buffer 120 that stores pixel component values corresponding to a display surface that is displayed on one or more of the plurality of displays 102-104. The apparatus 100 also includes a pixel component multi-stream encoder 122 for each display controller (and display in this example) that is operative to produce for output on a single link, packet based pixel component multi-stream information 124 as a single image stream. The packet based pixel component multi-stream information 124 includes at least a first stream that includes for a pixel, a portion of the per-pixel component values and at least a second stream that includes for the same pixel, a remaining portion of the per-pixel component values stored in the frame buffer 120. The packet based pixel component multi-stream information 124 is communicated as image stream information for output to the one or more displays 102-104.

For purposes of illustration only and not limitation, the display system illustrated will be described as one that can communicate in compliance with the DisplayPort 1.2 standard so that each of the plurality of displays 102-104 is connected to a respective pixel component multi-stream encoder 122 via a respective single link 123 over, for example, a respective wireless link cable or other suitable link compliant with DisplayPort 1.2 standard for example. Accordingly, each display 102-104 may, for example, serve as a sink device whereas the apparatus 100 serves as a source device for a plurality of sink devices. Alternatively, a hub for other displays may be connected to the encoder(s).

The apparatus may also include programmable crossbar logic 128 that is coupled to the plurality of display controllers 112-114 and is controlled by the controller 110 through suitable control information 130 to select which of the pixel component values from the differing display controllers to output to a respective pixel component multi-stream encoder 122. The apparatus 100 may also include, for example, a processor 132 such as a host CPU if desired and memory 134 which may store, for example, drivers executed by the processor 132 to control the controller 110 if, for example, the controller 110 is a graphics processor. The system of FIG. 1 may be, for example, a laptop computer, high definition television display system, handheld device, or any other suitable display system. For example, the system may also be, for example, a printer and the display 108 may be, for example, printer heads that are controlled to output pixels on paper. The memory 134 as known in the art may be suitably coupled to the processor through a bus 136 and the processor 132 may be suitably coupled to the controller 110 via a suitable bus 138.

The controller 110 may be, for example, a graphics processor unit with one or more suitable graphics core, a host processor, discrete logic, or any other suitable control logic operative to perform the operations as described herein. The display controllers 112-114 are controlled by the controller 110 via control information 141 to obtain pixel component values of pixels for an image frame from, for example, frame buffer 120. Display controllers as known in the art can read information from a frame buffer. In this example, pixel component values will be described with reference to an RGB alpha (RGBA) pixel format. However, any suitable pixel color format having more than three pixel component values may be employed for example, RGBW, RGBA, RGBZ, RGBY, or any other suitable pixel format.

Figure 2:
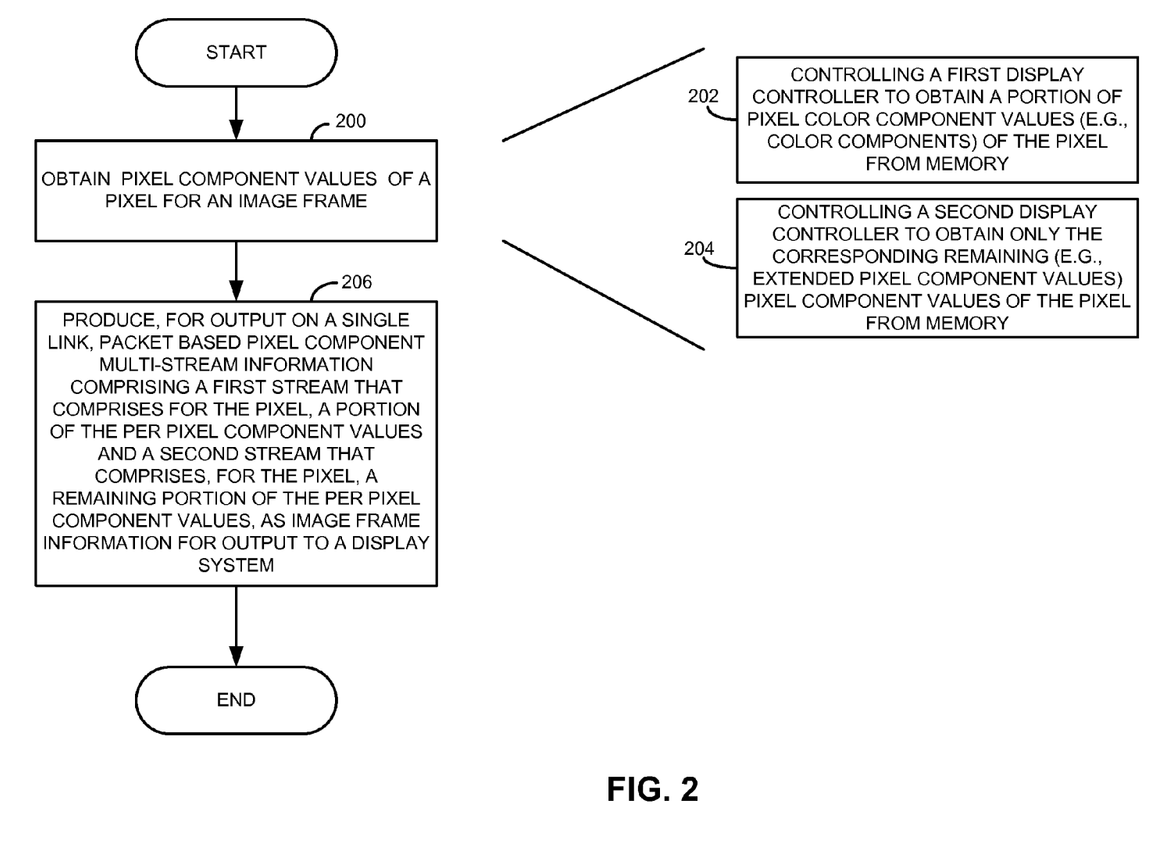
FIG. 2 is a flowchart illustrating one example of a method for providing pixel information for one or more displays in accordance with one example set forth in the disclosure.

Referring also to FIG. 2, a method for providing pixel information is illustrated and will be described in connection with the apparatus of FIG. 1. However, it will be recognized that the method and operations may be carried out by any suitable structure. In operation, the controller 110 indicates which display controller should obtain which portions of per-pixel component values for output to a display. This may be done, for example, in response to the controller determining that a frame is required for output to a display as known in the art. The display controllers as shown in block 200 in this example, obtain pixel component values of a pixel for an image frame. The frame buffer stores the pixel component values such as RGB and corresponding alpha values for a plurality of pixels corresponding to one or more image frames. Obtaining pixel component values of a pixel for an image frame may be done, for example, as shown by blocks 202 and 204.

For example, the controller 110 may instruct display controller 112 to obtain a portion of pixel color component values such as RGB values of a pixel (or group of pixels) from the frame buffer 120 and may indicate that the display controller should output a plurality of such pixel color component values for a block of pixels. Additionally, the controller 110 may control the display controller 114 to obtain a remaining portion 142 of the per-pixel component values such as the corresponding alpha values of the corresponding color pixel component values (RGB) obtained for each of the pixels obtained by display controller 112. In this example, the portion of the per-pixel component values (e.g., RGB color component values) is shown as 140 whereas the corresponding remaining portion of the per-pixel component values, in this example the corresponding alpha values due to the RGB pixel values, is obtained by the display controller 114. The display controllers 112 and 114 in this example output the portion of the per-pixel component values 140 and the corresponding remaining portion of the each of the per-pixel component values 142 to the pixel component multi-stream encoder 122 via the programmable crossbar 128. The programmable crossbar 128 is controlled by the controller 110 to output the corresponding first stream and second stream to the pixel component multi-stream encoder 122.

Stated another way, the controller 110 controls a first display controller 112 to obtain a portion of the pixel color component values 140, in this example RGB color component values of pixels for a first stream whereas the display controller 114 is controlled to obtain only the corresponding remaining pixel component values 142 such as an extended pixel component alpha value for each pixel that corresponds to the pixels for which the color component values 140 were obtained by the display controller 112. Thus, two streams of pixel component values for a same image are obtained using differing display controllers and are output to the pixel component multi-stream encoder 122 via the programmable crossbar 128. It will be recognized that the programmable crossbar need not be employed if only two display controllers are utilized. In this example, a plurality of display controllers are used in order to obtain the complete pixel component values for each pixel in a synchronized manner to provide suitable synchronization of the information for proper display by a given display.

The controller 110 controls the crossbar 128 to output the two streams of BGB and alpha data 140, 142 to a proper encoder for the display that needs the frame information. The encoder encodes the two streams as packet based multistream pixel component information for one image for a particular display. The crossbar and display controllers are controlled in a like manner to provide differing component information for the other display as needed by the other display. The display controllers can also be enabled to function as conventional display controllers to obtain entire frames of data for a given display and pass the data to a different type of encoder depending on the type of displays used.

As shown in block 206, the pixel component multi-stream encoder 122 produces for output on a single link 123 such as a DisplayPort cable coupled to each of the plurality of displays, packet based pixel component multi-stream information that includes a first stream that comprises for the pixel, the per-pixel component values 140 and a second stream that includes the remaining portion of the per-pixel component values 142 provided by the display controllers 112 and 114. The corresponding pixel component multi-stream encoder 122 packs the pixel component values 140 and 142 for the same image into the differing streams.

In one example, to pack the pixel component information, the pixel component multi-stream encoder 122 may utilize DisplayPort 1.2 three component stream formatting for one stream to, for example, communicate the portion of the per-pixel component values 142 such as the RGB pixel component values in the first stream. The pixel component multi-stream encoder 122 also encodes the alpha value corresponding to each of the pixels as the remaining portion of the per-pixel component values in a second stream. As such, the three component packing scheme of DisplayPort standard is employed for multiple streams wherein the second stream may only include alpha values. The first and second streams are aligned for proper synchronization so that the RGB values and corresponding alpha values from the differing streams can be suitably combined by the sink or display to which the multi-stream is destined. This embodiment may result in some wasted bandwidth since the second stream utilizes a three component stream format to only send a single component, namely the alpha component value.

However, where a six pixel component value format is employed such as for printers or other display systems, packing three component values for a single pixel in each of two streams will result in a full bandwidth multi-stream mechanism.

In another example, the pixel component multi-stream encoder 122 may utilize the Y or grayscale packing format compliant with the DisplayPort standard wherein, for example, the first stream includes a three component format of RGB and the second stream instead of employing the use of a grayscale component, instead is packed to send the remaining portion of the per-pixel component value in this example the alpha value, to accommodate a four pixel component format. For a four pixel component format, this technique does not waste bandwidth.

The component information can be defined for different streams in a multistream by any suitable mechanism. For example, to enable multistream color component communication, a source (sender of the multistream) may request the sink (device that receives the multistream information) to enable its additional sinks, which the sink does. The source knows which video sinks belong to the display device as they all share a common Container ID GUID. The source uses Plug & Play information or other information that indicates what format the sink uses to determine which component information needs to be assigned to each stream number driven to the sink. For example stream 0 may be a three component stream and stream 1 is for alpha or other component information. Other options are also possible.

The pixel component multi-stream encoder 122 then outputs the multi-streams in a synchronized manner to provide all the component values in the proper sequence and synchronization for a frame to be displayed by the appropriate display. Display controllers 116 and 118 may be suitably controlled to obtain portions of a per-pixel component values for a first stream and the remaining portions of the per-pixel component values for a second stream that correspond to another frame that may be output on a same display or another display.

As noted above, the pixel component multi-stream encoder 122 may produce the first stream to include the color component data such as RGB or YUV component data of the pixel component values from the frame buffer and produce the second stream to include extended pixel data, such as alpha information or Z information, corresponding to the color component data of the pixel for each of the plurality of pixels in a frame. The programmable crossbar 128 selects which of the plurality of first and second display controllers output respective color pixel component values and remaining per-pixel component values to the multi-stream encoder 122. This may be done, for example, based on whether pairs of multiple display controllers are used to obtain pixel component values for different frames that are output to a same display, or may be based on a type of display that receives the multi-stream information. For example, if display 108 is a display that is compliant with DisplayPort standard 1.2, then the pixel component multi-stream encoder may be employed. However, if the display is only compliant with, for example, DVI or HDMI formats, then the pixel component multi-stream encoder may not be employed and instead a different encoder such as an HDMI or DVI encoder is selected to properly format the component pixel information for the respective display.

Figure 3:
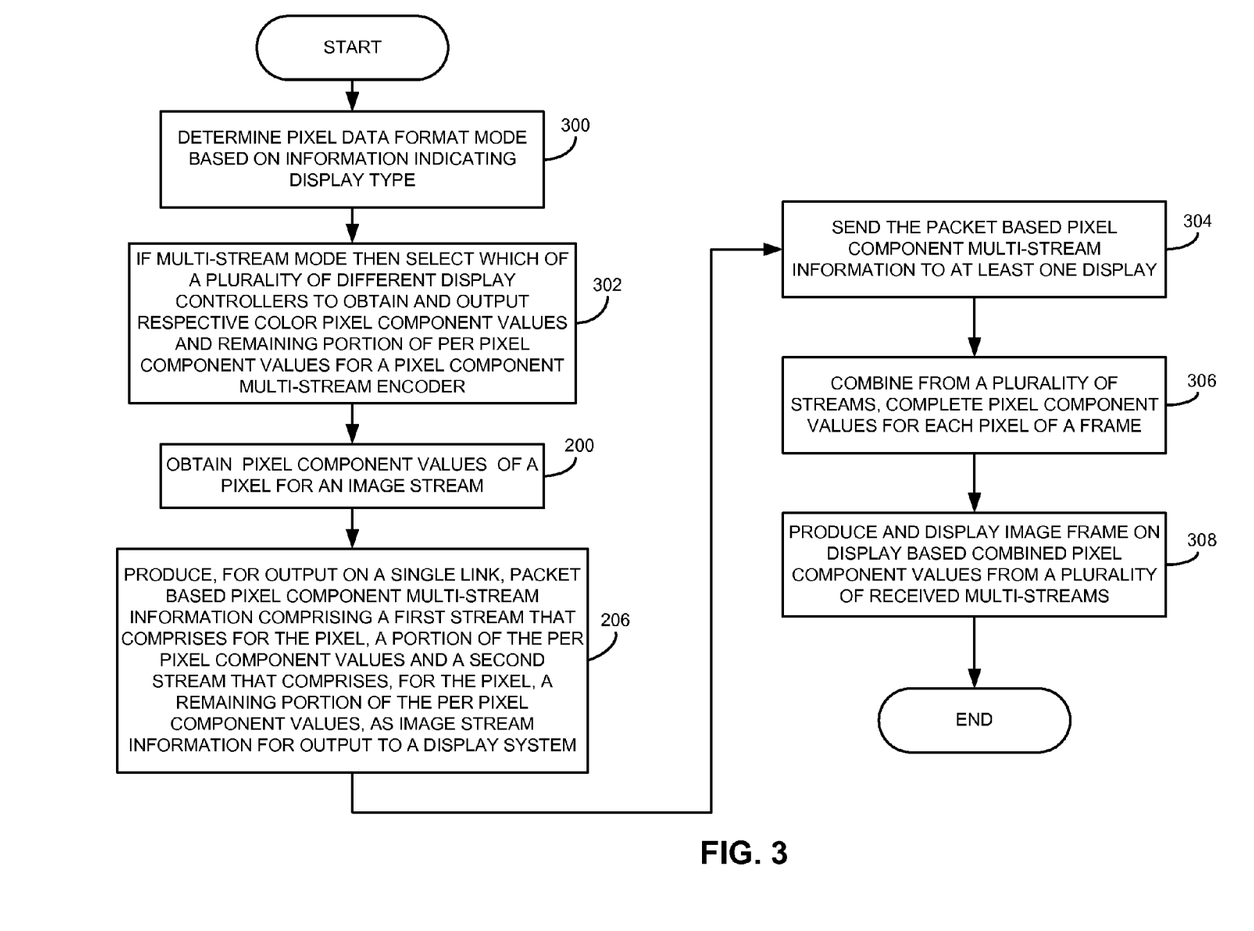
FIG. 3 is a flowchart illustrating one example of a method for providing pixel information for one or more displays in accordance with one example set forth in the disclosure.

FIG. 3 illustrates another method of providing pixel information wherein the apparatus 100 of FIG. 1 is a multi-data format mode apparatus. In this example, the controller 110 controls the display controllers to obtain the proper pixel component values depending upon the type of display that will display the information. For illustration purposes only, two data format modes will be described namely a DisplayPort format mode and an HDMI format mode.

As shown in block 300, the method includes determining the pixel data format mode based on information indicating a display type of one or more displays 102-108 that will display the image frame from the frame buffer. This may be done in any suitable manner such as through a user interface so that the user can indicate that the display or displays are DisplayPort compliant or HDMI compliant. Alternatively, the displays themselves can inform the apparatus 100 of their capabilities using an EDID type interface or any other suitable display communication interface as desired. As shown in block 302, if the pixel data format mode is determined to be a multi-stream mode such as where the display or displays are DisplayPort 1.2 compliant, then the controller selects which of the plurality of different display controllers 112-118 are used to obtain and output the respective color pixel component values and remaining pixel component values for a pixel component multi-stream encoder 122.

However, if the mode is determined to be a non-multi-stream mode such as an HDMI mode because the displays can only accommodate HDMI formatted information, then the controller controls a single display controller output, for example the HDMI based pixel format information to an HDMI encoder 160 that takes the pixel component values and formats them into an HDMI format suitable for display. The encoder may instead of packing the component values in a multi-streaming format may encode the differing pixel components from the different display controllers into one of a plurality of selectable differing formats prior to transmission to a display system, such as in HDMI format or DVI format.

Referring back to FIG. 3, if it is determined that a multi-stream mode has been determined, then the method includes obtaining the pixel component values of a pixel for an image stream as described above wherein a display controller obtains a portion of the pixel component values and another display controller is controlled to obtain the remaining and corresponding component value of a pixel for all the pixels of a frame and these are sent to the pixel component multi-stream encoder 122 which then produces the first and second streams as described above. The first and second streams are then sent to the sink device, in this case one or more displays 102-104 as shown in block 304. As shown in block 306, the display includes logic 168 (FIG. 1) that is operative to combine, from the plurality of streams, the complete pixel component values for each of the pixels so that the frame can be displayed on the display. For example, a DisplayPort compliant sink device may use a processor (e.g. logic) to combine the received first and second stream by extracting the pixel component values from each stream and link, for example, the four component values for each pixel which are then used as the display information for a given frame. This is shown in block 308. As such the display is an apparatus that includes a display (e.g., screen) and logic 168 coupled to the display that is operative to produce a display image based on packet based pixel component multi-stream information comprising a first stream that comprises for a pixel, a portion of the per pixel component values and a second stream that comprises, for the pixel, a remaining portion of the per pixel component values, as image stream information.

Examples of packets are described in section 2 of the Multi-stream Transport section of the DisplayPort 1.2 specification incorporated herein by reference. However, any suitable packet format may be used.

For auto configuration via Plug & Play, the source device 100 understands that multiple video sinks are all associated with a single display (e.g., 102), and which sink is which component of the stream. This can be done via vender specific extensions to any of DPCD, EDID, DisplayID or MCCS. By way of example, the source initially enables a single video sink and enables three component processing mode. The source device queries the abilities of the sink via DPCD, E-EDID, DID, MCCS, etc. protocols to determine if the sink device is capable of four or more pixel color component processing. The source device discovers from the queries that the sink is capable of such processing. Either right away or at some later point the source device decides to configure for the four or more pixel component processing mode. This may not happen initially as it might not be needed until a 3D game or application or movie is started by the source or based on some other condition as noted above. To enable four or more color component pixel processing, the source requests the sink to enable its additional sinks, which the sink does. The source knows which video sinks belong to the display device as they all share a common Container ID GUID. The source uses the Plug & Play information from the sink to determine which color component information needs to be assigned to each stream number driven to the sink. For example stream 0 is RGB color component information for a frame and stream 1 is corresponding alpha color component information for the same frame. Other options are also possible. Once the sink device receives multiple streams of related color component frame data in parallel it can process and display the information.

Exemplary embodiments of this invention, such as a computing device (e.g., laptop, smart phone, tablet, etc.) will be able to implement a reduced number of connections between the embedded display and the graphics or image generating device (e.g., graphics processors). In this way, desirable benefits in such embodiments can be obtained resulting from the reduced manufacturing complexities, costs and components, altered weight of the overall system, ease of diagnostics for device failures, and the like. Other benefits may also be present. Other embodiments may obtain a reduced set of benefits.

In one embodiment, the system employs a plurality of display controllers each of which performs a different gamut remapping operation. For example, one display controller may read the stored color component values from the frame buffer and perform a color conversion operation to produce an RGB prime values which correspond to the RGB values of an RGBW format whereas the second display controller accesses the same RGB values stored in the frame buffer and creates the W pixel component value. As such, the same RGB information is obtained twice, one by each of the two different display controllers. The display controllers may be, for example, in two different display pipes. As such, effectively two parallel gamut remap engines or color format converters are utilized, each performing a different gamut remap operation on the same original RGB values in the frame buffer. This operation may be controlled, for example, by the graphics processor or any other suitable logic based on, for example, a determination of the type of display system that is connected to the display controllers or the display interface. For example, switching a plurality of displays that are intended to display RGBW in an RGBW format with displays that display in a YUV alpha format may control the display controllers to generate the YUV alpha pixel component values in one mode when the suitable display system is connected whereas in another mode of operation a different color format is generated from the same color component values in the frame buffer or frame buffers. In another example a single color gamut generator may be used and the data can be stored in the frame buffer and read out by the several display controllers as described above.

In an alternative embodiment, a single display controller can be used to obtain all of the pixel component information for the multistreams. As such the apparatus provides pixel information for one or more displays by obtaining pixel component values of a pixel for an image stream and produces for output on a single link, packet based pixel component multi-stream information. A first stream may include for the pixel, a portion of the per pixel component values and a second stream may include, for the pixel, a remaining portion of the per pixel component values, as image stream information for output to one or more displays. The apparatus may be any suitable apparatus including but not limited to a laptop computer, tablet computer, desktop computer, handheld device, HDTV or printer.

The above detailed description of the invention and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. A method for providing pixel information for one or more displays comprising:
   producing, for output on a single link, packet based pixel component multi-stream information comprising a first stream that comprises a portion of pixel component values for a pixel and an interleaved second stream that comprises a remaining portion of the per pixel component values for the pixel, as image stream information for output to one or more displays.

2. The method of claim 1 wherein producing the packet based pixel component multi-stream information produces the first stream that comprises color component data and produces the second stream that comprises extended pixel data corresponding to the color component data of the pixel.

3. The method of claim 2 wherein the first portion of the per pixel component values comprises RGB component values and wherein the remaining portion of the per pixel component values is comprised of corresponding alpha information and wherein producing packet based multi-stream information comprises packing the RGB component values for the pixel into packets in the first stream and packing the corresponding alpha information in the second stream.

4. The method of claim 2 wherein the first portion of the per pixel component values comprises YUV component values and wherein the remaining portion of the per pixel component values is comprised of corresponding alpha information and wherein providing packet based multi-stream information comprises packing the YUV component values for the pixel into packets in the first stream and packing the corresponding alpha information in the second stream.

5. The method of claim 2 wherein obtaining the pixel component values of the pixel comprises controlling a first display controller to obtain only the color component data of the pixel from memory and controlling a second display controller to obtain only the corresponding remaining portion of the per pixel component values for the pixel from memory.

6. The method of claim 1 comprising changing to a multi-stream pixel component packing mode from a non multi-stream pixel component packing mode based on a type of display system and outputting the packet based pixel component multi-stream information over the single link to the display system and producing a display based on the packet based pixel component multi-stream information.

7. The method of claim 1 comprising selecting which of a plurality of different display controllers obtain and output respective color pixel component values and remaining portion of the per pixel component values to a pixel component multi-stream encoder wherein the color component values and remaining portion of the per pixel component values comprise at least five components per pixel.

8. The method of claim 1 comprising:
receiving the packet based multi-component multi-stream information produced by the pixel component multi-stream encoder;
combining from the first and second stream, the portion of the per-pixel component values and the remaining portion of the per-pixel component values as complete pixel component values for each pixel of a frame; and
producing a display image frame on a display using the complete pixel component values based on the combined information from the first and second stream.

9. An apparatus for providing pixel information for one or more displays comprising:
a pixel component multi-stream encoder operative to produce, for output on a single link, packet based pixel component multi-stream information comprising a first stream that comprises for a pixel, a portion of the per pixel component values and an interleaved second stream that comprises, for the pixel, a remaining portion of the per pixel component values, as image stream information for output to one or more displays.

10. The apparatus of claim 9 wherein the pixel component multi-stream encoder is operative to produce the first stream to comprise color component data and produces the second stream to comprise extended pixel data corresponding to the color component data of the pixel.

11. The apparatus of claim 10 wherein the first portion of the per pixel component values comprises RGB component values and wherein the remaining portion of the per pixel component values is comprised of corresponding alpha information and wherein the pixel component multi-stream encoder is operative to produce packet based multi-stream information by packing the RGB component values for the pixel into packets in the first stream and packing the corresponding alpha information in the second stream.

12. The apparatus of claim 10 wherein the first portion of the per pixel component values comprises YUV component values and wherein the remaining portion of the per pixel component values is comprised of corresponding alpha information and wherein the pixel component multi-stream encoder is operative to pack the YUV component values for the pixel into packets in the first stream and pack the corresponding alpha information in the second stream.

13. The apparatus of claim 10 comprising at least a first and second display controller operative to obtain pixel component values of a pixel an image frame, wherein the at least first display controller is operative to obtain only the color component data of the pixel from memory and wherein the at least second display controller is operative to obtain only the corresponding remaining portion of the per pixel component values for the pixel from memory.

14. The apparatus of claim 13 comprising logic operative to select which of the plurality of first and second display controllers output respective color pixel component values and remaining portion of the per pixel component values to the pixel component multi-stream encoder based on a type of display.

15. The apparatus of claim 9 comprising logic operative to change the pixel component multi-stream encoder to a multi-stream pixel component packing mode from a non multi-stream pixel component packing mode based on a type of display that is used to display the pixel information and cause the pixel component multi-stream encoder to output the packet based pixel component multi-stream information for communication over the single link to the display system.

16. The apparatus of claim 15 comprising the display system operative to produce a display image based on the packet based pixel component multi-stream information.

17. An apparatus comprising:
a display; and
logic operatively coupled to the display and operative to produce a display image, for output on the display, based on packet based pixel component multi-stream information comprising a first stream that comprises for a pixel, a portion of per pixel component values and an interleaved second stream that comprises a remaining portion of the per pixel component values, as image stream information.

18. A video display system comprising:
an apparatus for providing pixel information for one or more displays comprising:
at least a first and second display controller operative to obtain pixel component values of a pixel for an image frame; and
a pixel component multi-stream encoder operative to produce from the obtained pixel component values from the at least first and second display controller, for output on a single link, packet based pixel component multi-stream information comprising a first stream that comprises for the pixel, a portion of the per pixel component values and an interleaved second stream that comprises, for the pixel, a remaining portion of the per pixel component values, as image stream information for output to one or more displays; and
at least one display operative to receive the packet based multi-component multi-stream information produced by the pixel component multi-stream encoder and operative to combine from the first and second stream, the portion of the per-pixel component values and the remaining portion of the per-pixel component values has complete pixel component values for each pixel of a frame and operative to produce a display image frame on a display using the complete pixel component values based on the combined information from the first and second stream.

19. An apparatus for providing pixel information for one or more displays comprises at least one display controller operative to obtain pixel component values of a pixel for an image stream; and an encoder operative to produce for output on a single link, packet based pixel component multi-stream information comprising a first stream that comprises a portion of the per pixel component values and an interleaved second stream that comprises a remaining portion of the per pixel component values, as image stream information for output to one or more displays.

* * * * *